Patented Aug. 24, 1943

2,327,862

UNITED STATES PATENT OFFICE 2,327,862

PHONOGRAPH RECORD

Joseph N. Borglin, Wilmington, Del., assignor to Hercules Powder Company, Wilmington, Del., a corporation of Delaware No Drawing. Application October 3, 1940, Serial No. 359,547

11 Claims. (Cl. 106—37)

This invention relates to phonograph records and, more particularly, to phonograph records containing polymerized rosin or a polyhydric alcohol ester thereof.

Phonograph records have heretofore been manufactured chiefly from a composition comprising shellac as the principal or essential binding ingredient together with suitable percentages of lubricants and fillers. From time to time attempts have been made to replace the expensive shellac constituent either partially or entirely with other materials but such attempts have not been entirely satisfactory, since it is difficult to find a shellac substitute which combines the properties which make shellac an excellent phonograph record binder. Among these properties are toughness, readiness of flow during molding under heat and pressure, heat stability, hardness and resistance to air or deformation, sufficient water resistance, sufficiently high melting point, and re-workability of rejects.

It is an object of the present invention to provide a phonograph record composition of improved properties.

Another object is to provide a composition wherein shellac has been partially or completely eliminated without detriment to the resulting records.

Another object is to produce a phonograph record which exhibits superior properties with regard to heat resistance, fidelity of reproduction and in numerous other respects.

Still other objects will more fully hereinafter appear.

It has been found that by the use of polymerized rosin or polyhydric alcohol esters thereof in the record composition, an improved record results. Polymerized rosin or its polyhydric alcohol ester may be substituted partially or completely for the shellac heretofore invariably used. For example, excellent results have been obtained from a composition wherein the binder consists essentially of polymerized rosin and shellac in such proportions that the ratio of polymerized rosin to shellac varies from about 1 to 4 to about 3 to 1. In view of the high melting point and other properties of polymerized rosin, it may be and desirably is used in an amount considerably in excess of the shellac, for example, in an amount such that the ratio of polymerized rosin to shellac is in the neighborhood of from about 1.5 to 1 up to about 2 to 1.

Corresponding compositions wherein the binder consists essentially of an ester of polymerized rosin such as the glycerine ester and shellac may be prepared and employed with satisfactory results.

By reason of its melting point, thermoplasticity, relatively inert nature both with respect to the oxygen in the air, moisture or water, and metallic surfaces such as the surface of molds, and in addition by reason of its complete miscibility with shellac and with other components commonly used in phonograph record compositions such as hard wood pitch, substantially petroleum hydrocarbon insoluble pine wood resin, etc., polymerized rosin and its polyhydric alcohol esters produce a record of excellent characteristics.

It has been found that a phonograph record may advantageously be made from a composition embodying polymerized rosin or its polyhydric alcohol ester and ethyl cellulose, together with the other constituents commonly present in sound record compositions such as lubricant, dyes or pigments, fillers, etc. Such a composition may comprise a binder consisting essentially of the polymerized rosin or ester thereof and ethyl cellulose, and in this way, shellac may be completely eliminated. For example, an excellent phonograph record may be molded from a composition wherein the binder consists essentially of polymerized rosin and ethyl cellulose in such proportions that the ratio of polymerized rosin to ethyl cellulose is not less than about 1 to 10 and the ratio of ethyl cellulose to polymerized rosin not over about 10 to 1. Preferably, the ratio of polymerized rosin to ethyl cellulose is in the neighborhood of about 1 to 2. Corresponding proportions of the glycerine ester of polymerized rosin and ethyl cellulose may be employed.

Compositions of polymerized rosin or its ester and ethyl cellulose preferably embody a plasticizer which may range upwardly to about 20% by weight of the composition. In general, the amount of plasticizer should be proportioned to the amount of ethyl cellulose present in the composition, and may suitably lie within the range of from about 10% to about 20% by weight based on the weight of ethyl cellulose. If desired, a plasticizer may be incorporated in the shellac-polymerized rosin composition described above although ordinarily its presence will not be necessary.

Polymerized rosin-ethyl cellulose and polymerized rosin ester-ethyl cellulose compositions prepared in accordance with the present invention exhibit much greater toughness and flexibility than do those which contain shellac. For these reasons, the ethyl cellulose compositions are preferable to the shellac-containing compositions.

If suitable proportions are employed, a ternary binder embodying polymerized rosin or a polyhydric alcohol ester thereof, ethyl cellulose and shellac may be prepared, the polymerized rosin or its ester acting as an agent mutually compatible with shellac and ethyl cellulose which are not compatible with one another. The proportions of these three components are preferably such that a homogeneous blend or mixture is obtained. This may be accomplished by using a sufficiently high proportion of polymerized rosin or its ester.

In addition to the binder, the record composition preferably embodies a filler which may be present in proportions ranging up to about 70% by weight of the total composition. Generally, in the case of shellac-containing records, the proportion of filler will be above 20% and preferably above 50% by weight. In the case of composition containing ethyl cellulose, the filler may be considerably reduced and may range, for example, from about 5% to about 10% by weight.

Examples of suitable fillers are china clay, finely ground slate, infusorial earth, ferric oxide, carbon black, cotton flock, whiting, titanium dioxide, zinc oxide, etc. If desired, a suitable dye may be incorporated such as black aniline dye, nigrosine, etc.

Preferably, the compositions will include a lubricant which functions both as a molding lubricant and to reduce the drag upon the needle. Examples of suitable lubricants are waxes such as candelilla wax, stearic acid, paraffin wax, metallic soaps such as calcium stearate, zinc stearate, magnesium stearate, etc., mineral oil, etc. The amount of lubricant may range up to about 20% by weight of the compositions.

Examples of suitable plasticizers which may be incorporated in amounts ranging up to approximately 20% by weight of the compositions are tricresyl phosphate, dibutyl phthalate, diamyl phthalate, triphenyl phosphate, etc.

The composition may be prepared by mixing the constituents together in any suitable manner so as to obtain an intimate mixture, as for example by milling them upon a roll mill at an elevated temperature in a manner which is conventional for the milling of plastics and the like. Alternatively, the ingredients may be masticated under pressure in a Banbury mixer or the like. The mixing device should be maintained at a temperature sufficiently high to colloid the mass advantageously but insufficient to cause undue decomposition of the mix. For example, mixing at temperatures ranging from about 150° F. to about 300° F. has been found to be satisfactory. Following mixing, the plastic may be shaped into biscuits containing sufficient material for one record, which are then pressed into records in the usual manner.

Below are given several specific examples showing typical embodiments of the present invention. The polymerized rosin used in these examples was polymerized wood rosin. The polymer had a melting point of 98–100° C., and an acid number of 151–155. Methods of polymerizing rosin are well known to the art and need not be described here. In general, polymerized rosin may be said to be characterized by a melting point increase above ordinary rosin of from about 5° to about 100° C., by a molecular weight of from about 5% to about 400% greater than ordinary rosin in its pure state, by substantial freedom from hardening substances held in combination, by an iodine value materially lower than that of ordinary rosin, and an acid number ranging from about that of the original rosin to say about 100.

Preferably, polymerized rosin employed in the present invention has a melting point of at least 95° C. ranging upwardly to about 170° C., the melting point of the pure dimer.

The ethyl cellulose used in the examples was what is known as high viscosity ethyl cellulose having a viscosity of 60–80 seconds as measured by noting the time of fall of a $\frac{1}{16}$ inch steel ball through 10 inches of the solution in a 25 mm. diameter glass tube at 25° C., the solution consisting of 20% by weight of ethyl cellulose dissolved in a solvent consisting of 80% by weight of toluene and 20% by weight of ethyl alcohol, and an ethoxyl content of 46.8–48.5%. Instead of this ethyl cellulose, any other water-insoluble ethyl cellulose may be used in accordance with the present invention. For example, the ethyl cellulose may have an ethoxyl content of from about 41% to about 51% and preferably from about 44% to about 49%, and a viscosity ranging from about 1 second to about 600 seconds as measured by the foregoing test.

Example 1

| | Per cent by weight |
|---|---|
| Polymerized rosin (pulverized) | 25 |
| Ethyl cellulose | 45 |
| Candelilla wax | 5 |
| Tricresyl phosphate | 5 |
| Zinc oxide | 16 |
| Carbon black | 4 |

These ingredients were mixed and then milled at 280–300° F. on a two-roll mill until colloided. The hot product was worked to one roll and was then peeled from the roll. Records pressed therefrom were unusually satisfactory.

Example 2

| | Per cent by weight |
|---|---|
| Polymerized rosin (pulverized) | 56 |
| Orange shellac (ground) | 24 |
| Zinc oxide | 16 |
| Carbon black | 4 |

These ingredients were mixed and then milled at 150° F. on a two-roll mill until colloidal. Then the product was taken from the mill in a thin sheet, formed into biscuits and pressed into records.

Example 3

| | Per cent by weight |
|---|---|
| Polymerized rosin (pulverized) | 48 |
| Orange shellac (ground) | 32 |
| Zinc oxide | 32 |
| Carbon black | 4 |

These materials were mixed in the same manner as before on a two-roll mill at a temperature of about 150° F., formed into biscuits and pressed into records in the usual way.

Example 4

| | Per cent by weight |
|---|---|
| Glycerine ester of polymerized rosin | 10 |
| Ethyl cellulose | 75 |
| Tricresyl phosphate | 15 |

The ester gum of polymerized rosin was substantially the tri-ester of the polymerized rosin used in Examples 1 to 3. The ingredients were mixed in the same manner as before at a temperature of 280–300° F. and formed into records.

Instead of glycerine ester of polymerized rosin, other esters may be employed which are solid at room temperature such as esters prepared with the following polyhydric alcohols: ethylene glycol, proplene glycol, trimethylene glycol, butylene glycol, pentaglycerol, erythritol, pentaerythritol, diglycerol, mannitan, sorbitan, dulcitan, adonitol, arabitol, xylitol, rhamnitol, mannitol, sorbitol, dulcitol, lactositol, perseitol, volemitol, etc. Of these, it is preferred to employ those esters having a melting point of at least 95° C. It will be understood that the melting point will depend upon the particular polyhydric alcohol employed, the melting point of the polymerized rosin, and the extent of esterification. Partially or completely esterified polymerized rosin may be employed. Likewise mixtures of polymerized rosin and polymerized rosin polyhydric alcohol ester may be employed.

From the foregoing, it will be seen that the present invention enables the production of phonograph records of improved properties in a convenient and economical manner. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. A phonograph record having a record surface comprising polymerized rosin and shellac in such proportions that the ratio of polymerized rosin to shellac is not less than about 1 to 4 and not over about 3 to 1.

2. A phonograph record having a record surface comprising by weight from about 20% to about 65% of polymerized rosin, from about 15% to about 50% of shellac, a lubricant, and from about 20% to about 70% of filler.

3. A phonograph record having a record surface comprising by weight from about 48% to about 56% of polymerized rosin having a melting point of at least 95° C., from about 24% to about 32% of shellac, about 16% of zinc oxide and about 4% of carbon black.

4. A phonograph record having a record surface comprising by weight from about 10% to about 40% of polymerized rosin, from about 25% to about 80% of ethyl cellulose, up to about 20% of a plasticizer, from about 2% to about 18% of a lubricant, and from about 5% to about 40% of a filler.

5. A phonograph record having a record surface comprising substantially by weight

| | Per cent |
|---|---|
| Polymerized rosin | 25 |
| Ethyl cellulose | 45 |
| Candelilla wax | 5 |
| Tricresyl phosphate | 5 |
| Zinc oxide | 16 |
| Carbon black | 4 |

6. A phonograph record having a record surface comprising polymerized rosin and ethyl cellulose in such proportions that the ration of polymerized rosin to ethyl cellulose is not less than about 1 to 10 and the ratio of ethyl cellulose to polymerized rosin not over about 10 to 1.

7. A phonograph record having a record surface comprising by weight from about 10% to about 40% of polymerized rosin, from about 25% to about 80% of ethyl cellulose, and up to about 20% of a plasticizer.

8. A phonograph record having a record surface comprising polymerized rosin and ethyl cellulose in such proportions that the ratio of polymerized rosin to ethyl cellulose is not less than about 1 to 10 and the ratio of ethyl cellulose to polymerized rosin not over about 10 to 1, and shellac.

9. A phonograph record having a record surface comprising shellac and a composition selected from the group consisting of polymerized rosin and polymerized rosin polyhydric alcohol esters, in such proportions that the ratio of said composition to shellac is not less than about 1 to 4 and not over about 3 to 1.

10. A phonograph record having a record surface comprising ethyl cellulose and a composition selected from the group consisting of polymerized rosin and polymerized rosin polyhydric alcohol esters, in such proportions that the ratio of said composition to ethyl cellulose is not less than about 1 to 10 and the ratio of ethyl cellulose to said composition not over about 10 to 1.

11. A phonograph record having a record surface comprising the glycerin ester of polymerized rosin and ethyl cellulose in such proportions that the ratio of said rosin to ethyl cellulose is not less than about 1 to 10 and the ratio of ethyl cellulose to polymerized rosin not over about 10 to 1.

JOSEPH N. BORGLIN.